Patented Oct. 24, 1933

1,931,768

UNITED STATES PATENT OFFICE 1,931,768

FERTILIZER MANUFACTURE

Harry C. Moore, Chicago, Ill., assignor to Armour Fertilizer Works, Chicago, Ill., a corporation of New Jersey No Drawing. Application February 1, 1929
Serial No. 336,919

3 Claims. (Cl. 71—7)

This invention concerns a new type of fertilizer material or component and a novel method for its introduction into fertilizer mixtures, and it relates more specifically to the solution of an ingredient having fertilizer value in a liquid containing ammonia and the admixture of such solution with one or more other fertilizer constituents, at least one of which is acidic.

The novel process greatly simplifies the transportation and distribution of certain types of concentrated fertilizer ingredients, such as ammonium nitrate, and renders its conveyance and use less hazardous, since such salt is dangerous during transportation, storage in bulk and introduction into fertilizer mixtures, due to its explosive properties. It is, further, very hygroscopic and is consequently difficult to pulverize, screen and uniformly mix and distribute in fertilizer mixtures, when employed in the small quantity which would often be used under those circumstances.

I have discovered that such ammonium nitrate, as well as other materials having fertilizer properties, when used alone, or in certain admixtures, may, with advantage, be dissolved in a liquid containing ammonia, at the point of production of the latter and the product shipped in suitable steel tank cars, or such solution may be effected at the fertilizer factory prior to, or at the time of, admixture of fertilizer mixtures as heretofore described.

By this practice, when such one or more concentrated fertilizer salts is or are used in relatively small quantities, a practically uniform distribution thereof throughout the mixture is obtained, resulting in a mixed fertilizer more uniform in composition than usual, and, due to the deposition of salts on other particles, the product is less liable to segregation in storage and during handling.

According to one preferred method of practicing the process, ammonium nitrate, or other suitable salt having fertilizer value, or two or more of such salts, is or are dissolved in a liquid containing ammonia, and, if more than the quantity of any one of the solid salts dissolved in this manner is required in the final mixture than could be so dissolved, sufficient water may be added to effect complete solution of the materials used.

As an example of the amounts of ingredients which may be satisfactorily employed in performing the process, the following is submitted:

Approximately 1200 pounds of superphosphate, approximately 200 pounds of sulphate of ammonia, and approximately 500 pounds of muriate of potash are mixed in a standard fertilizer mixer and to this batch is added 100 pounds of a liquid containing ammonia of suitable concentration, for example 25% to 28% $NH_3$, in which 20 pounds of ammonium nitrate is dissolved.

Of course it will be understood that the above is only an example of one fertilizer mixture which may be made by my process, and it will be appreciated that many other appropriate mixtures of widely varying compositions may be made by and have the advantages of such process according to commercial needs.

By thus initially or preliminarily dissolving the perilous or unsafe ammonium nitrate or similar salt in the liquid containing ammonia, such dangerous fertilizer ingredient is rendered practically innocuous or harmless, hence allowing its safe shipment and assisting in its substantially even or equable apportionment throughout the fertilizer mixture when introduced therein, the ammonia of the liquid being employed to overcome the acidic condition of the one or more associated ingredients of the mixture. By this is meant that the ammoniacal liquid is added in such amount as to at least substantially neutralize the free acid present as determined when testing a water solution of the mixture using methyl orange as an indicator.

Those acquainted with the art will also understand that the method or process described and the ingredients employed may be varied within comparatively wide limits without departing from the essence of the invention as defined by the appended claims.

I claim:

1. The process of making a mixed fertilizer, consisting in dissolving ammonium nitrate in an ammoniacal liquid and mixing a sufficent amount of such solution with superphosphate to at least substantially neutralize the free acid present and at the same time to practically uniformly distribute the ammonium nitrate throughout the mixture.

2. The process of producing a fertilizer which comprises treating superphosphate with an ammoniacal solution of ammonium nitrate.

3. The process of producing a fertilizer which comprises treating superphosphate with an aqueous ammoniacal solution of ammonium nitrate.

HARRY C. MOORE.